US011768752B2

(12) United States Patent
Skvortsov et al.

(10) Patent No.: US 11,768,752 B2
(45) Date of Patent: Sep. 26, 2023

(54) OPTIMIZING LARGE SCALE DATA ANALYSIS

(71) Applicant: Google LLC, Mountain View, CA (US)

(72) Inventors: Evgeny Skvortsov, Mountain View, CA (US); Jeffrey Wilhelm, Mountain View, CA (US); Yip Man Tsang, Mountain View, CA (US); William George Kahn Bradbury, Mountain View, CA (US); Andreas Ulbrich, Mountain View, CA (US); Zhaosheng Bao, Mountain View, CA (US); Stuart Kendrick Harrell, Mountain View, CA (US)

(73) Assignee: Google LLC, Mountain View, CA (US)

( * ) Notice: Subject to any disclaimer, the term of this patent is extended or adjusted under 35 U.S.C. 154(b) by 287 days.

(21) Appl. No.: 16/960,817

(22) PCT Filed: Aug. 21, 2019

(86) PCT No.: PCT/US2019/047393
§ 371 (c)(1),
(2) Date: Jul. 8, 2020

(87) PCT Pub. No.: WO2021/034320
PCT Pub. Date: Feb. 25, 2021

(65) Prior Publication Data
US 2022/0171693 A1    Jun. 2, 2022

(51) Int. Cl.
G06F 11/34       (2006.01)
G06F 16/2458     (2019.01)

(52) U.S. Cl.
CPC ...... *G06F 11/3452* (2013.01); *G06F 11/3442* (2013.01); *G06F 16/2462* (2019.01)

(58) Field of Classification Search
CPC ............. G06F 11/3452; G06F 16/2462; G06F 11/3442
See application file for complete search history.

(56) References Cited

U.S. PATENT DOCUMENTS

2007/0106666 A1    5/2007  Beckerle et al.
2017/0116136 A1*   4/2017  Macnicol .............. G06F 16/245
(Continued)

FOREIGN PATENT DOCUMENTS

KR    10-2003-0040263    5/2003
KR    10-2005-0117541    12/2005

OTHER PUBLICATIONS

Fischer et al., "Timely Semantics: A Study of a Stream-Based Ranking System for Entity Relationships", International Conference on Financial Cryptography and Data Security, Oct. 2015, 17 pages.
(Continued)

*Primary Examiner* — Yoshihisa Ishizuka
(74) *Attorney, Agent, or Firm* — Fish & Richardson P.C.

(57) ABSTRACT

Methods, systems, and apparatus, including computer programs encoded on a computer storage medium, that facilitate resource and space efficient analysis of large scale datasets. Methods include obtaining activity data for objects in a dataset. For each data item in the dataset, a hashed parameter having a binary representation is generated using an identifier for the object. A register is identified from among a set of registers based on the hashed parameter. A determination is made that the hashed parameter for the object contributes to an aggregation amount that specifies a number of occurrences of the object in the dataset. Based on this determination, an aggregation amount stored in the register is updated. Based on aggregation amounts stored in the set of registers, a reporting output is generated that provides an aggregate distribution of the objects in the dataset based on the activity data for the objects.

21 Claims, 3 Drawing Sheets

(56) References Cited

U.S. PATENT DOCUMENTS

2018/0268167 A1    9/2018  Alberton et al.
2018/0300363 A1*  10/2018  Ertl .................... G06F 16/2255
2019/0026491 A1    1/2019  Telford et al.

OTHER PUBLICATIONS

PCT International Search Report in International Appln No. PCT/US2019/047393, dated Feb. 18, 2020, 16 pages.
Office Action in Japanese Appln. No. 2020-542129, dated Dec. 13, 2021, 6 pages (with English translation).
Office Action in Korean Appln. No. 10-2020-7022602, dated Sep. 27, 2021, 10 pages (with English translation).
Office Action in European Appln. No. 19765368.6, dated Aug. 8, 2022, 6 pages.

* cited by examiner

OPTIMIZING LARGE SCALE DATA ANALYSIS

BACKGROUND

This specification generally relates to computing processes for resource and space efficient storage and analysis of large scale datasets.

Collecting and analyzing data about different objects in a digital environment (e.g., online interactions, components, resources, etc.) can be beneficial to providers of content, products, and/or services. In some cases, providers can aggregate data for numerous (e.g., millions or billions) objects to, for example, improve the provider's services and/or improve a user online experience. For example, providers may aggregate the data for components or resources of a server farm to determine how frequently components of the server farm are failing (or operating in a certain manner). As another example, providers may aggregate the data about several devices interacting with certain content to determine how frequently these devices interact with the content. These types of operations, particularly when performed on large datasets, can present significant technical challenges in efficiently processing, querying, and storing the data, and obtaining accurate results can cause significant system latency.

SUMMARY

In general, one innovative aspect of the subject matter described in this specification can be embodied in methods that include the operations of obtaining activity data for a plurality of objects in a dataset, wherein each object in the dataset performs activities in a digital environment and the activity data represents the activities; for each data item in the dataset: generating, using an identifier for an object specified in the data item, a hashed parameter for the object, wherein the hashed parameter has a binary representation; identifying a register from among a set of registers based on the binary representation of the hashed parameter, wherein each register in the set of registers is used to store data about objects in the dataset; determining, based on the binary representation of the hashed parameter, that the hashed parameter for the object contributes to an aggregation amount that specifies a number of occurrences of the object in the dataset; and in response to determining that the hashed parameter for the object contributes to the aggregation amount, updating the aggregation amount stored in the register; and generating, based on aggregate amounts stored in the set of registers, a reporting output that indicates a set of data items, wherein each data item identifies an estimated number of objects in the dataset that performed activities in the digital environment at a particular aggregation amount. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

In some implementations, each object represents a user; and an aggregation amount represents a frequency value.

In some implementations, identifying a register from among a set of registers based on the binary representation of the hashed parameter, comprises: identifying a first portion of the binary representation of the hashed parameter; and identifying the register using the first portion of the binary representation of the hashed parameter.

In some implementations, each register in the set of registers comprises a data structure that stores data about a received hashed parameter, wherein the data structure includes: a first field for storing data specifying a number of leading zeroes in a second portion of the received hashed parameter; a second field for storing data specifying trailing bits in a second portion of the received hashed parameter; and a third field for storing data specifying an aggregation amount that indicates a number of occurrences when (i) an existing data value in the first field matches the number of leading zeroes and (ii) an existing data value in the second field matches the trailing bits.

In some implementations, determining, based on the binary representation of the hashed parameter, that the hashed parameter for the object contributes to an aggregation amount, comprises: determining a number of leading zeros from the second portion of the binary representation of the hashed parameter; determining trailing bits from the second portion of the binary representation of the hashed parameter; and determining, based on the number of leading zeros and the trailing bits, that the hashed parameter impacts an existing data value stored in the third field of the data structure of the register.

In some implementations, determining, based on the number of leading zeros and the maximum number of trailing bits, that the hashed parameter impacts an existing data value stored in the third field of the data structure of the register, comprises: determining that the existing data value stored in the first field of the data structure of the register is the same as the number of leading zeros; and determining that the existing data value stored in the second field of the data structure of the register is the same as the maximum number of trailing bits.

In some implementations, updating the aggregation amount stored in the register, comprises incrementing the existing data value stored in the third field of the data structure of the register by one.

In some implementations, generating, based on aggregate amounts stored in the set of registers, a reporting output that indicates a set of data items, wherein each data item identities an estimated number of objects in the dataset that performed activities in the digital environment at a particular aggregation amount, comprises: identifying a set of unique aggregate amounts based on aggregation amounts stored in the set of registers; for each particular aggregation amount in the set of aggregation amounts, determining an estimated number of objects of the dataset that performed activities at the particular aggregation amount, the determining includes: determining a number of registers storing an aggregation amount that matches the particular aggregation amount; adjusting the number of registers storing the aggregation amount that matches the particular aggregation amount based on a hash collision correction factor; determining an average number of object stored in each register of the set of registers; and scaling the adjusted number of registers by the average number of objects.

Particular embodiments of the subject matter described in this specification can be implemented to enhance probabilistic data structures, such as HyperLogLog (HLL), by storing activity data (as further described below) about objects in a space-efficient manner that in turn enables efficiently determining a distribution of the objects in the dataset based on their activity data. Conventional methods require substantially more computing and storage resources than those required by techniques and/or systems described in this specification, which is especially the case when performing these operations on large datasets. In contrast, the techniques and/or systems in this specification require substantially less storage and can perform more time and resource efficient processing of large datasets to determine a frequency distribution of the objects in the dataset based on the objects' activity data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
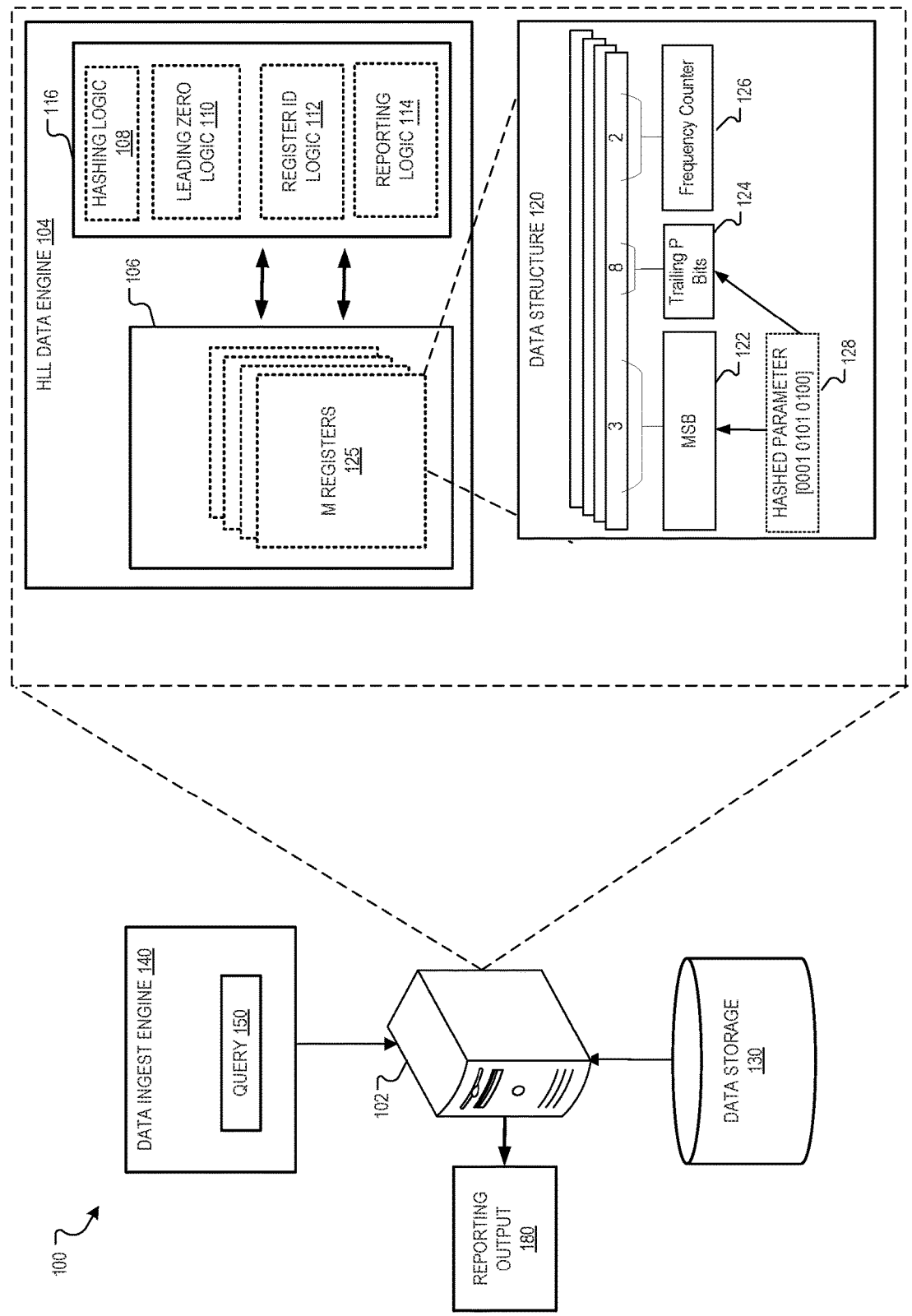
FIG. 1 is a block diagram of an example computing system for computing information for a dataset.

This specification describes techniques for using a probabilistic cardinality estimator, such as a HyperLogLog data structure, for providing a distribution of objects in a dataset across different aggregate values (e.g., frequencies) based on the activity data for the objects. The techniques described in this specification enhance conventional HyperLogLog (HLL) data structures in a manner that enables computing such aggregate (e.g., frequency) distributions, which is not possible using the conventional HLL data structures. It will be appreciated that other types of probabilistic data structures may also be used to implement the techniques described in this specification.

An object can be an entity, resource, or component, such as users, spam events, system components, digital assets, etc. Each object in the dataset is associated with or performs certain activities in a digital environment and the activity data in the dataset represents the activities of the objects. This can include, for example, data describing device interactions with certain digital assets (e.g., portions of content), such as which users clicked on, viewed, or otherwise interacted with a content for a particular digital campaign. As another example, the activity data can include log data about hardware/component events (e.g., failures, resets, outages, network calls, memory access, or other events) in a network environment.

For context, the conventional HLL data structure can be used to measure or estimate the number of unique objects in a large dataset (i.e., the cardinality of the dataset). However, the conventional HLL data structures cannot determine an aggregate distribution of the objects based on the activity data of the objects. For example, while the conventional HLL data structure can be used to determine the number of users in a dataset that have interacted with a particular digital content, this data structure cannot be used to determine a distribution of the number of users who have viewed the content at particular frequencies (e.g., one time, two times, three times, etc.).

As described below and in greater detail throughout this specification, the techniques described in this specification enhance conventional FILL data structures to enable determining an aggregate (e.g., frequency) distribution of objects in a dataset based on the activity data for these objects in a digital environment. The HLL registers of the HLL data structure can be enhanced to include three fields: one field that stores the number of leading zeros for an object in a dataset, which also represents the bit position of the most significant non-zero bit (as already stored by standard HLL registers), a second field that stores the trailing bits for that object (or another stable identifier of the object, such as for example, a separate hash value for the object that is made up of p bits), and a third field that stores an aggregation counter that is based on the result of a commutative reduction function $f(S\_t,l)=S\_[t+1]$, which stores information about all the objects with the same key. Examples of such aggregation counters can include, among others, (1) a frequency counter that counts the number of occurrences of the object in the dataset, (2) a counter that counts the most recent timestamp at which a particular event was recorded at, and (3) a counter that counts counting the number of times an error code was observed at each error logging levels.

An HLL data engine assigns objects in the dataset to a set of M registers. When data for an object is received, the object's unique identifier (as further described below) is hashed using a hash function to generate a hashed parameter (as further described below) that has a binary representation. The HLL data engine uses a certain number of bits (e.g., the first four bits) of the hashed parameter to assign the object to one of the M registers.

The HLL data engine determines an aggregate number of times that the object has been associated with or performed a certain activity. As described below and in greater detail throughout this specification, the HLL data engine accomplishes this by evaluating whether the remaining bits of the hashed parameter (i.e., the bits other than those that were used to identify the register) contribute to an aggregation amount, e.g., that specifies a number of occurrences of the object in the dataset.

The HLL data engine determines the number of leading zeros (which also represents the bit position of the most significant non-zero bit) for the remaining bits of the hashed parameter. If the number of leading zeros is the same as the value stored in the first field of the register, the HLL data engine determines a set of trailing bits for the previously determined most significant bit (or another appropriate stable identifier, as described above). If the determined trailing bits are the same as the value stored in the trailing p bits field of the register, the HLL data engine determines that the current object is the same as the object for which data is already stored in the register. As a result, the HLL data engine updates the aggregation counter field of the register, e.g., by incrementing the value stored in that field by one or by performing another appropriate commutative reduction operation.

The HLL data engine can determine the number of objects in the dataset that occurred at and/or above a certain aggregate value (e.g., frequency). The HLL data engine computes this value by scaling the number of registers (e.g., adjusted to account for any hash collisions) for which the aggregation counter was set to a certain aggregate value by the average number of objects per register.

Further to the descriptions throughout this document, a user may be provided with controls allowing the user to make an election as to both if and when systems, programs, or features described herein may enable collection of information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 is a block diagram of an example computing system 100 for computing information for a dataset. System 100 generally includes a computing server 102, a HLL data engine 104, a data storage device 130, and a data ingest engine 140. As described in more detail below, the system 100 includes special-purpose hardware circuitry configured to execute specific computational rules that measure or estimate the aggregate distribution of the objects in a dataset based on the activity data for the objects. These techniques can be applied to various applications. For example, the techniques described in this specification can be used in digital campaign reach assessment, which includes generating data describing a distribution of users that have interacted with a particular campaign at different frequencies, e.g., how many unique users interacted (e.g., viewed, clicked on, etc.) with a digital content once, twice, thrice, etc. As another example, the techniques described in this specification can be used to analyze hardware/component failures in a large scale network environment, which includes generating statistics about how frequently certain components or computing devices fail in the network environment. It will be understood that the techniques described in this specification may be used in other applications as well.

As shown in FIG. 1, the system 100 includes a computing server 102, which is configured to use a HyperLogLog (HLL) data engine 104 to determine an aggregate distribution of objects in a dataset based on their activity levels. As used in this specification, the term engine refers to a data processing apparatus that performs a set of tasks.

The HLL data engine 104 is included within computing server 102 as a sub-system of hardware circuits (e.g., special-purpose circuitry) that includes one or more processor microchips. In general, computing server 102 can include processors (e.g., central or graphics processing units), memory, and data storage devices 106 that collectively form computer systems of computing server 102. Processors of these computer systems process instructions for execution by server 102, including instructions stored in the memory or on the dataset storage device 106 to display graphical information for output at an example display monitor of system 100.

In some implementations, execution of the stored instructions causes one or more of the actions described in this specification to be performed by the computing server 102 or the HLL data engine 104. In some implementations, multiple processors may be used, as appropriate, along with multiple memories and types of memory. For example, computing server 102 may be connected with multiple other computing devices, with each device (e.g., a server bank, groups of servers, modules, or a multi-processor system) performing portions of the actions, operations, or logical flows described in this specification.

System 100 can receive, via data ingest engine 140, a dataset including activity data for a plurality of objects in a digital environment. The received dataset is provided to the HLL data engine 104 of the computing server 102.

As further described below with reference to FIG. 2, the HLL data engine 104 uses the logic engine 116, including the hashing logic 108, the leading zero logic 110, and the register ID logic 112, to store the data of the dataset in a set of M registers 125 in memory 106.

Data ingest engine 140 also receives queries, which request data about the number of objects in the dataset that are associated with or otherwise performed activities in the digital environment at particular frequencies. For example, a query 150 can request data about the number of unique users in the dataset that viewed, accessed, or otherwise interacted with content a certain number of times (e.g., one time, two times, three times, etc.). The data ingest engine 140 sends the query 150 to the computing server 102, which in turn uses the HLL data engine 104 (and in particular, the reporting logic 114) to determine the number of distinct users in a dataset and their distribution across different frequencies based on their activity data. The HLL data engine 104 then, alone or in combination with a front end engine of the computing server 102, provides the determined distribution data as reporting output 180. In the above example, the reporting output 180 can be statistics in the form of text or a visual representation (e.g., a histogram, a pie chart, etc.) showing the number of users who are associated with or otherwise performed certain activities at different frequencies, e.g., one time, two times, etc. Alternatively or in addition, the reporting output 180 may be in the form of a data structure that can be processed by computing server 102 or by another computing device.

The components of the HLL data engine 104 (as shown in FIG. 1) that are used in generating such statistics and the respective operations of these components are described further with reference to FIG. 2 below.

Figure 2:
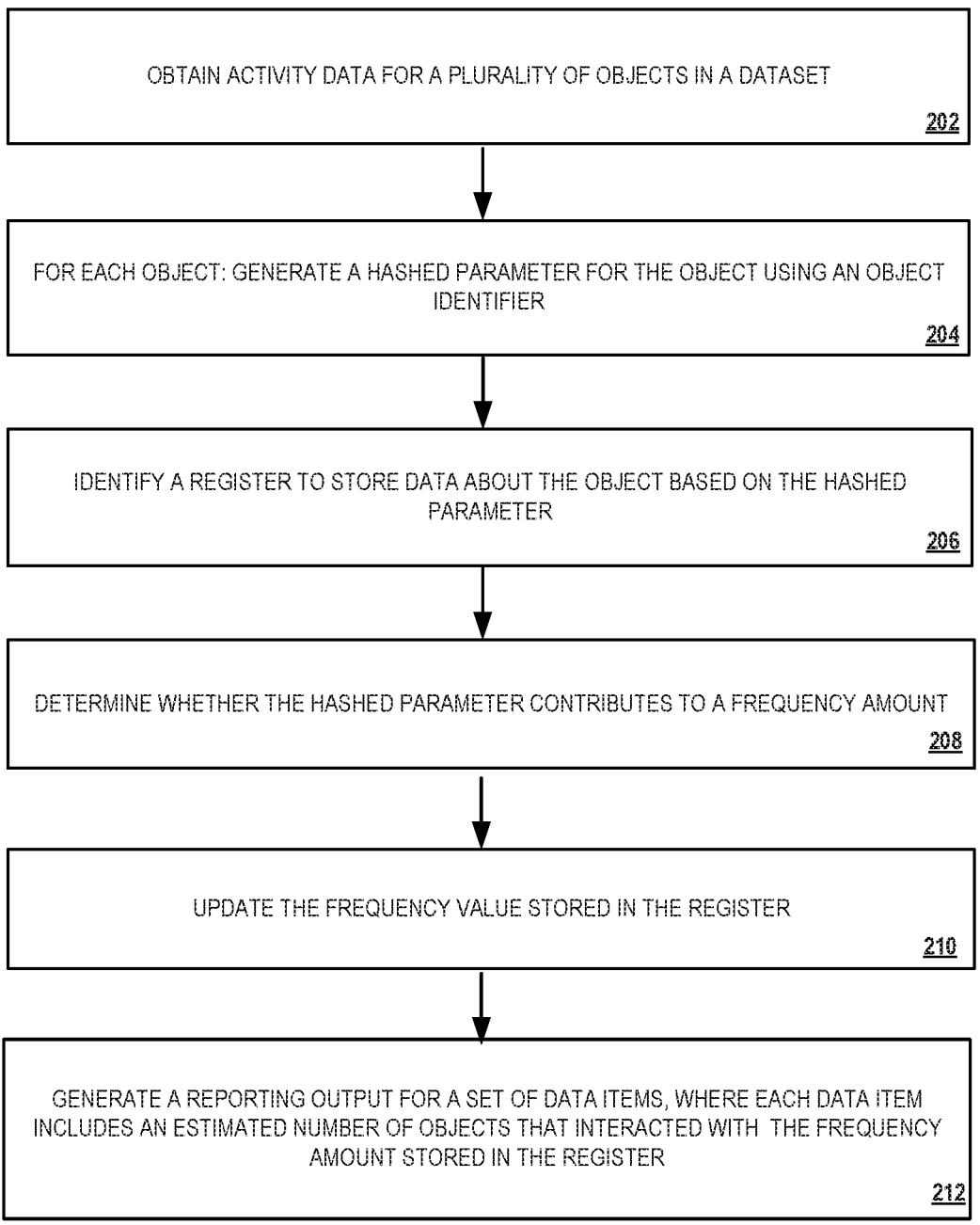
FIG. 2 is a flowchart of an example process for computing aggregate distributions based on activity data for objects in a dataset.

FIG. 2 is a flowchart of an example process 200 for computing aggregate distributions based on activity data for objects in a dataset. Process 200 can be implemented or executed using computing resources of system 100, and in particular the HLL data engine 104, described above. Operations of the process 200 are described below for illustration purposes only. Operations of the process 200 can be performed by any appropriate device or system, e.g., any appropriate data processing apparatus. Operations of the process 200 can also be implemented as programmed instructions stored on a non-transitory computer readable medium (such as the memory and/or data storage device 130, described with reference to FIG. 1) and executed by at least one processor of the computing server 102.

The data ingest engine 140 obtains activity data for a plurality of objects in a dataset (at 202). In some implementations, the data ingest engine 140 receives data logs specifying the activity data in a digital environment for objects in a dataset (wherein each object can occur one or more times in the dataset). The data logs can include separate fields (or delimiters that can be used to delineate different data items) corresponding to an object identifier for the object and the corresponding activity data for the object. As used in this specification, the object identifier is a value (e.g., a number, alphanumeric string, data structure) that uniquely identities a particular object in the dataset. In some implementations, the object identifier is a byte (e.g., eight bits), while in other implementations the object identifier is a data word formed by, e.g., 12 bits, 16 bits, 32 bits, or 64 bits. In some cases, a variable number of bits can be used to form the object identifier, such as more than 64 bits or fewer than 64 bits.

The data ingest engine 140 sends the received dataset to the HLL data engine 104 of the computing server 102. For each data item in the dataset, the process 200 then performs the operations 204, 206, 208, and 210, which are further described below. As a result of performing these operations, the process 200 accumulates an aggregate distribution of objects in the data set based on the activity data associated with or performed by these objects.

The H ILL data engine 104 generates a hashed parameter 128 for the object using the hashing logic 108 (at 204). In some implementations, the hashing logic 108 applies one or more hash functions (which may include any conventional hash function/s) to the object identifier for the object to generate the hashed parameter (which may also be referred to as a hash, hash code, or hash value). The hashed parameter has a binary representation whose length is dependent upon the hash function itself or the parameters of the hash function. The hash of object identifier for the object is indicated as the hashed parameter 128, as shown in FIG. 1.

The HLL data engine 104 identifies a register from among a set of registers that can be used to store data about the object (at 206). In some implementations, data for a dataset can be stored in a set of M registers 125. Using a first portion (e.g., first four bits) of the object's hashed parameter 128, the register ID logic 112 identifies one of the M registers that can be used to store data about the object. For example, for the hashed parameter 128 (0001 0101 0100), the register ID logic 112 can uses the first four bits (0001) to identify one of the M registers. It will be appreciated that the number of registers 125 is less than the number of data items in the dataset.

The HLL data engine 104 determines whether the hashed parameter contributes to a frequency amount (at 208). In some implementations, the hashing logic 108 identifies a second portion of the hashed parameter 128, which includes the bits of the hashed parameter without the first set of bits that are used to identify the appropriate register (as described above at operation 206). For the hashed parameter 128 (0001 0101 0100), the bits (0101 0100) do not include the first four bits that are used by the register ID logic 112 to identify the appropriate register (as described in the preceding paragraph).

The leading zero logic 110 determines the number of leading zeros (which also represents the bit position of the most significant non-zero bit) in the second portion or set of bits. In some implementations, the leading zero logic 110 determines the number of leading zeros by counting the number of zeros, from left to right, in the second set of bits until the bit position of the first "1" in the second set of bits is identified. For example, the number of leading zeros for the second set of bits (0101 0100) of the hashed parameter 128 is one because, when counting from left to right, one zero is identified before the first "1" is encountered.

The HLL data engine 104 determines the number of trailing bits for the most significant bit in the second set of bits, as identified in the previous paragraph. In some implementations, the HLL data engine 110 determines the trailing bits by identifying all the bits in the second set of bits after the most significant bit, which is the location where the first "1" is identified when counting from left to right (as described in the preceding paragraph). For example, the trailing bits in the second set of bits (0101 0100) is "010100" because these are the bits that follow the first "1" that was identified when counting the leading zeros for the second set of bits.

As shown in FIG. 1, each register in the set of M registers 125 includes a data structure 120 that has three fields: a field for the most significant bit 122, a field for the trailing p bits 124, and a field for the aggregation counter 126. In some implementations, instead of storing the trailing p hits, field 124 stores any number of trailing bits for the most significant bit in the second set of bits or alternatively, a stable identifier for the object, such as a separate hash value made up of p bits.

In total, the total amount of information stored in each register may only be two bytes (or 16 bits). In contrast, the standard HLL algorithm, which only stores the number of leading zeros in each register, generally required six bits of data. In other words, relative to the standard HLL algorithm, the HLL registers described in this specification can store additional data about objects in the dataset with only a marginal increase in storage requirement per register (as compared with storing the entirety of the activity data for objects in the dataset, which would require much more than two bytes of storage space).

In some implementations, the aggregation counter field 126 stores the frequency amount, which specifies a number of occurrences of the object in the dataset. As further described below, the object's hashed parameter contributes to the aggregation amount based on a comparison of the number of leading zeros and the trailing bits of the hashed parameter (as determined by the HLL data engine 104) with the values stored in the most significant bit field 122 and the trailing p hits field 124 of the data structure 120 in the register (identified in operation 206), respectively. In some implementations, instead of storing a frequency count for each object, the aggregation counter field 126 can aggregate information about objects with the same key (e.g., counting the most recent timestamp that a particular event was recorded at, counting the number of times an error code was observed at each error logging levels, etc.).

When the number of leading zeros determined by the leading zero logic 110 is less than the value stored in field 122, the leading zero logic 110 does not update the data structure 120. In other words, the existing values in fields 122, 124, and 126 are retained. Because this operation does not result in updating the aggregation counter field 126, the object's hashed parameter does not contribute to the aggregation (e.g., frequency) amount.

When the number of leading zeros determined by the leading zero logic 110 exceeds the value stored in field 122, the leading zero logic 110 updates field 122 with the value of the most significant bit determined by the leading zero logic 110. In such instances, the HLL data engine 104 also (1) updates the value stored in field 124 with the trailing bits value calculated by the HLL data engine 104 and (2) resets the value stored in field 126 to zero.

When the number of leading zeros determined by the leading zero logic 110 is the same as the value stored in field 122, the leading zero logic 110 does not update the value stored in the field 122. In such instances, the HLL data engine 104 also determines whether to update the values stored in the fields 124 and 126. As further described below, it does so by comparing the trailing bits determined by the HLL data engine 104 with the value stored in the trailing p bits field 124 of the data structure 120.

If the value of the trailing bits determined by the HLL data engine 104 is larger than the value stored in the trailing p bits field 124 of the data structure 120, the HLL data engine 104 (1) updates the field 124 with the value of the trailing bits determined by the HLL data engine 104 and (2) resets the value of the aggregation counter field 126 to zero.

If the value of the trailing bits determined by the HLL data engine 104 is less than the value stored in the trailing p bits field 124 of the data structure 120, the HLL data engine engine 104 retains (i.e., does not update) the values stored in fields 122, 124, and 126.

If, however, the value of the trailing bits determined by the HLL data engine 104 is the same as the value stored in the trailing p bits field 124 of the data structure 120, the HLL data engine 104 determines that the current object is the same as the object for which data is already stored in the data structure 120. In such instances, the HLL data engine 104 (1) does not update the value already stored in the trailing p bits field 124 and (2) updates the value stored in the aggregation counter field 126 based on the commutative reduction function involving the current value of the field and the object (at 210). In implementations where the aggregation counter field 126 is a frequency counter, the HLL data engine 104 updates the value in this field by incrementing the value stored in this field 126 by one (e.g., if the value stored in the aggregation counter field 106 is 2, the HLL data engine 104 increments that value by one, which results in a value of 3). It will be appreciated that when an aggregation distribution other than frequency is to be determined, the HLL data engine 104 uses the commutative reduction function to appropriate scale (e.g., multiplying, dividing, incrementing by more than one, etc.) the value in the field 126.

Because the above-described operation results in updating the aggregation counter field 126, the object's hashed parameter contributes to the aggregation amount.

As described above, in some implementations, the HLL data engine 104 performs operations 206, 208, and 210 based on the single hash representation generated for the object at operation 204. In other implementations, the HLL data engine 104 can perform operations 206, 208, and 210 using separate hash representations. In other words, the hashing logic 108 can use the object identifier to generate separate hash representations: one hash representation can be used to identify the appropriate register in the set of M registers 125, a second hash representation from which the number of leading zeros are determined, and a third hash representation from which the trailing hits are determined. The above described operations 206 to 210 can then be performed using these separate hash representations.

The data ingest engine 140 receives a query 150 requesting an aggregation distribution of the number of objects in the dataset that performed activities in the digital environment at different frequencies (at 212). For example, the query 150 can request a frequency distribution of the number of users in a dataset that interacted with certain digital content at different frequencies (one time, two times, three times, etc.). In some implementations, the data ingest engine 140 sends the query 150 to the computing server 102, which in turn routes the query 150 to the reporting logic 114 of the logic engine 116.

In response to the query 150, the reporting logic 114 generates a reporting output that represents an aggregate distribution of the objects in the dataset based on the associated activities or activities performed by these objects in the digital environment (at 212). The reporting logic 114 estimate the aggregate distribution based on the aggregate value stored in the registers 125. The reporting logic 114 generates this reporting output by performing the following operations. In some implementations, the reporting logic 114 determines the different possible aggregate values by identifying a set of values including the unique aggregate values stored in aggregation counter field 126 in the set of registers 125. In some implementations, the query 150 may identify the aggregate values, in which case, the reporting logic 114 can skip the operation of identifying the different possible aggregate values stored in field 126 of the registers. In some implementations, the reporting logic 114 may access a set of aggregate values specified by an administrator of the system (and stored in the data storage device 130), in which case, the reporting logic 114 can skip the operation of identifying the different possible aggregate values stored in the registers.

In some implementations, for each identified aggregate value, the reporting logic 114 determines a number of registers that have the same value stored in the aggregation counter field 126 as the identified aggregate value. In such implementations, the reporting logic 114 counts all registers for which the value in the aggregation counter field 126 is the same as the identified aggregate value. In other implementations, the reporting logic 114 counts all registers for which the value in the aggregation counter field 126 is the same as or greater than the identified aggregate value.

In some instances, hash collisions may arise when storing and updating values in the data structure 120 of the registers 125. For example, two object identifiers for two deferent objects in the dataset, when hashed by the hashing logic 108, may update the same register and may have the same number of leading zeros and the same trailing bits. In the case of a frequency counter, the value of this field should only be incremented by one in this scenario; however, because of the hash collision, value of this field 126 is instead incorrectly incremented by two. In other words, even though both objects, e.g., may have interacted with the same content only once, the aggregation counter field 126 may incorrectly reflect that a single object interacted with the same content twice. In some implementations where another aggregate (i.e., other than frequency) is being measured, the reporting logic 114 counts all registers that satisfy some criteria, which can be specified in the query (e.g. having more errors at one reporting level than another, or having a value between two bounds), that provides a function to map the value in field 126 to a boolean (e.g., include in the count or not).

To account for such error arising from hash collisions, the reporting logic 114 obtains the count of registers for which the value in the aggregation counter field 126 is the same as or greater than the identified aggregate value and then adjusts (e.g., reduces) this count by a correction factor. The correction factor (also referred to as a hash collision correction factor), F, can be represented by F(C, M, n)), and estimates the number of hash collisions expected at the identified aggregate value (n) for a number of distinct objects (C) in the dataset that have performed or are associated with certain activity, which are stored in the set of M registers 125. The number of distinct elements that have performed or are associated with certain activity (i.e., the cardinality of the dataset (C)) is determined using the standard HLL algorithm. In some implementations, the correction factor is based on empirically determined lookup table of reduction values indexed by C, M, and f.

To obtain the total number of objects at a particular aggregate value, the reporting logic 114 scales (e.g., multiplies) the adjusted number of registers (as determined in the previous paragraph) at the particular aggregate value by the average number of objects per register. The average number of objects per register is determined by dividing the cardinality of the dataset C (as determined using the standard HLL algorithm) by M, which is the number of registers 125. The reporting logic 114 repeats the above operations for each identified frequency. As such, the total number of object at a particular aggregate value can be represented using the following equation:

$$R_n = C * \frac{B_n - F(C, M, n)}{M}$$

where (1) $R_n$ is the number of objects at a particular aggregate value n, (2) $B_n$ is the number of buckets with the aggregation counter field set to n, (3) C is the cardinality of the dataset, (4) M is the total number of registers 125, and (5) F(C,M,n) is the correction factor.

In some implementations, reporting logic 114 sends the identified frequencies and the corresponding number of determined objects to a front end engine of the computing server 102, which uses these values to generate a report, e.g., reporting output 180, that is provided to the entity from which the query 150 was received. The front end engine can use the values provided by the reporting logic 114 to generate statistics that include a set of data items, in which each data item identifies an estimated number of objects in the dataset that is associated with or performed activities in the digital environment at a particular frequency. These statistics can be in the form of text and/or visuals (e.g., a histogram, a pie chart, etc.) on the reporting output 180, and show the distribution of the number of objects at different frequencies based on the activity data of the objects.

Figure 3:
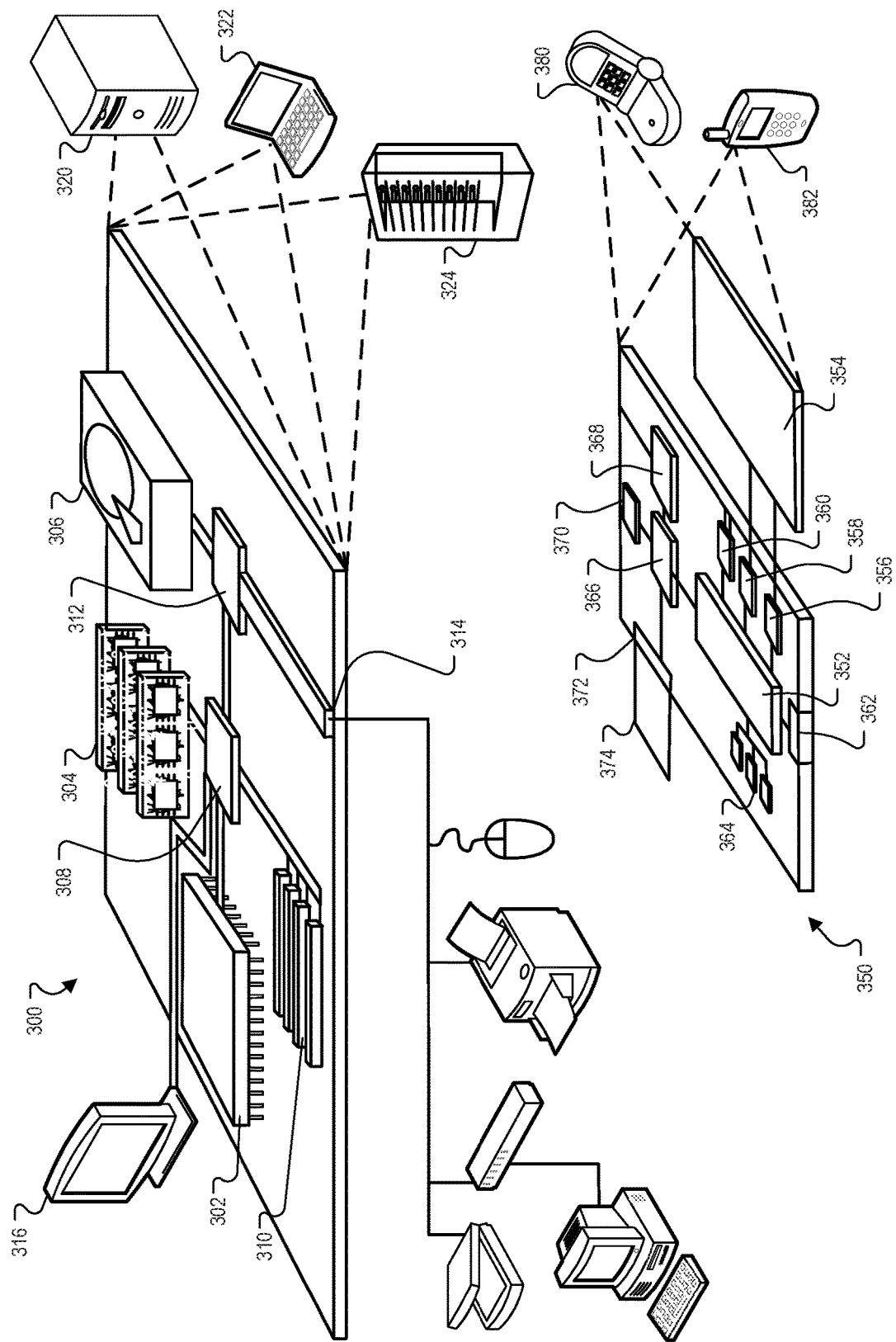
FIG. 3 is a block diagram of a computing system that can be used in connection with methods described in this specification.

FIG. 3 is a block diagram of computing devices 300, 350 that may be used to implement the systems and methods described in this document, either as a client or as a server or plurality of servers. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a computer-readable medium. In one implementation, the memory 304 is a volatile memory unit or units. In another implementation, the memory 304 is a non-volatile memory unit or units.

The storage device 306 is capable of providing mass storage for the computing device 300. In one implementation, the storage device 306 is a computer-readable medium. In various different implementations, the storage device 306 may be a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 304, the storage device 306, or memory on processor 302.

The high-speed controller 308 manages bandwidth-intensive operations for the computing device 300, while the low speed controller 312 manages lower bandwidth-intensive operations. Such allocation of duties is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can process instructions for execution within the computing device 350, including instructions stored in the memory 364. The processor may also include separate analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD display or an OLED display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication (e.g., via a docking procedure) or for wireless communication (e.g., via Bluetooth or other such technologies).

The memory 364 stores information within the computing device 350. In one implementation, the memory 364 is a computer-readable medium. In one implementation, the memory 364 is a volatile memory unit or units. In another implementation, the memory 364 is a non-volatile memory unit or units. Expansion memory 374 may also be provided and connected to device 350 through expansion interface 372, which may include, for example, a SIMM card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provided as a security module for device 350, and may be programmed with instructions that permit secure use of device 350. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS receiver module 370 may provide additional wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smartphone 382, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

As used in this specification, the terms "module," "engine," and "component" are is intended to include, but is not limited to, one or more computers configured to execute one or more software programs that include program code that causes a processing unit(s)/device(s) of the computer to execute one or more functions. The term "computer" is intended to include any data processing or computing devices/systems, such as a desktop computer, a laptop computer, a mainframe computer, a personal digital assistant, a server, a handheld device, a smartphone, a tablet computer, an electronic reader, or any other electronic device able to process data.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer implemented method including:
   obtaining a dataset comprising data for a plurality of objects, wherein each object in the dataset performs activities in a digital environment and the data for the plurality of objects represents the activities;
   for each data item in the dataset:
      generating, using an identifier for an object specified in the data item, a hashed parameter for the object, wherein the hashed parameter has a binary representation;
      identifying a register from among a set of registers based on a first portion of the binary representation of the hashed parameter, wherein each register in the set of registers comprises a data structure that stores data about objects in the dataset, wherein the data structure for each register in the set of registers has a first field, a second field, and a third field, and wherein the third field stores an aggregation amount representing a number of occurrences of a corresponding object in the dataset;
      determining, based on a comparison of a second portion of the binary representation of the hashed parameter with data in the first field and the second field of the data structure of the register, that the hashed parameter for the object contributes to the aggregation amount; and
      in response to determining that the hashed parameter for the object contributes to the aggregation amount, updating the aggregation amount stored in the third field of the register; and
   generating, based on aggregate amounts stored in the set of registers, a reporting output that indicates a set of data items, wherein each data item identifies an estimated number of objects in the dataset that performed activities in the digital environment at a particular aggregation amount.

2. The computer-implemented method of claim 1, wherein:
   each object represents a user; and
   an aggregation amount represents a frequency value.

3. The computer implemented method of claim 1, wherein the data structure includes:
   the first field for storing data specifying a number of leading zeroes in the second portion of the received hashed parameter;
   the second field for storing data specifying trailing bits in the second portion of the received hashed parameter; and
   the third field for storing data specifying the aggregation amount.

4. The computer implemented method of claim 3, wherein determining, based on the binary representation of the hashed parameter, that the hashed parameter for the object contributes to an aggregation amount, comprises:
   determining a number of leading zeros from the second portion of the binary representation of the hashed parameter;
   determining trailing bits from the second portion of the binary representation of the hashed parameter; and
   determining, based on the number of leading zeros and the trailing bits, that the hashed parameter impacts an existing data value stored in the third field of the data structure of the register.

5. The computer implemented method of claim 4, wherein determining, based on the number of leading zeros and the maximum number of trailing bits, that the hashed parameter impacts an existing data value stored in the third field of the data structure of the register, comprises:
   determining that the existing data value stored in the first field of the data structure of the register is the same as the number of leading zeros; and
   determining that the existing data value stored in the second field of the data structure of the register is the same as the maximum number of trailing bits.

6. The computer implemented method of claim 4, wherein updating the aggregation amount stored in the register, comprises incrementing the existing data value stored in the third field of the data structure of the register.

7. The computer implemented method of claim 3, wherein generating, based on aggregate amounts stored in the set of registers, a reporting output that indicates a set of data items, wherein each data item identifies an estimated number of objects in the dataset that performed activities in the digital environment at a particular aggregation amount, comprises:
   identifying a set of unique aggregate amounts based on aggregation amounts stored in the set of registers;

for each particular aggregation amount in the set of aggregation amounts, determining an estimated number of objects of the dataset that performed activities at the particular aggregation amount, the determining includes:
  determining a number of registers storing an aggregation amount that matches the particular aggregation amount;
  adjusting the number of registers storing the aggregation amount that matches the particular aggregation amount based on a hash collision correction factor;
  determining an average number of object stored in each register of the set of registers; and
  scaling the adjusted number of registers by the average number of objects.

8. A system, comprising:
one or more memory devices storing instructions; and
one or more data processing apparatus that are configured to interact with the one or more memory devices, and upon execution of the instructions, perform operations including:
obtaining a dataset comprising data for a plurality of objects, wherein each object in the dataset performs activities in a digital environment and the data for the plurality of objects represents the activities;
for each data item in the dataset:
  generating, using an identifier for an object specified in the data item, a hashed parameter for the object, wherein the hashed parameter has a binary representation;
  identifying a register from among a set of registers based on a first portion of the binary representation of the hashed parameter, wherein each register in the set of registers comprises a data structure that stores data about objects in the dataset, wherein the data structure for each register in the set of registers has a first field, a second field, and a third field, and wherein the third field stores an aggregation amount representing a number of occurrences of a corresponding object in the dataset;
  determining, based on a comparison of a second portion of the binary representation of the hashed parameter with data in the first field and the second field of the data structure of the register, that the hashed parameter for the object contributes to the aggregation amount; and
  in response to determining that the hashed parameter for the object contributes to the aggregation amount, updating the aggregation amount stored in the third field of the register; and
generating, based on aggregate amounts stored in the set of registers, a reporting output that indicates a set of data items, wherein each data item identifies an estimated number of objects in the dataset that performed activities in the digital environment at a particular aggregation amount.

9. The system of claim 8, wherein each object represents a user; and an aggregation amount represents a frequency value.

10. The system of claim 8, wherein the data structure includes:
the first field for storing data specifying a number of leading zeroes in the second portion of the received hashed parameter;
the second field for storing data specifying trailing bits in the second portion of the received hashed parameter; and
the third field for storing data specifying the aggregation amount.

11. The system of claim 10, wherein determining, based on the binary representation of the hashed parameter, that the hashed parameter for the object contributes to an aggregation amount, comprises:
determining a number of leading zeros from the second portion of the binary representation of the hashed parameter;
determining trailing bits from the second portion of the binary representation of the hashed parameter; and
determining, based on the number of leading zeros and the trailing bits, that the hashed parameter impacts an existing data value stored in the third field of the data structure of the register.

12. The system of claim 11, wherein determining, based on the number of leading zeros and the maximum number of trailing bits, that the hashed parameter impacts an existing data value stored in the third field of the data structure of the register, comprises:
determining that the existing data value stored in the first field of the data structure of the register is the same as the number of leading zeros; and
determining that the existing data value stored in the second field of the data structure of the register is the same as the maximum number of trailing bits.

13. The system of claim 11, wherein updating the aggregation amount stored in the register, comprises incrementing the existing data value stored in the third field of the data structure of the register.

14. The system of claim 10, wherein generating, based on aggregate amounts stored in the set of registers, a reporting output that indicates a set of data items, wherein each data item identifies an estimated number of objects in the dataset that performed activities in the digital environment at a particular aggregation amount, comprises:
identifying a set of unique aggregate amounts based on aggregation amounts stored in the set of registers;
for each particular aggregation amount in the set of aggregation amounts, determining an estimated number of objects of the dataset that performed activities at the particular aggregation amount, the determining includes:
  determining a number of registers storing an aggregation amount that matches the particular aggregation amount;
  adjusting the number of registers storing the aggregation amount that matches the particular aggregation amount based on a hash collision correction factor;
  determining an average number of object stored in each register of the set of registers; and
  scaling the adjusted number of registers by the average number of objects.

15. A non-transitory computer readable medium storing instructions that, when executed by one or more data processing apparatus, cause the one or more data processing apparatus to perform operations comprising:
obtaining a dataset comprising data for a plurality of objects, wherein each object in the dataset performs activities in a digital environment and the data for the plurality of objects represents the activities;
for each data item in the dataset:
  generating, using an identifier for an object specified in the data item, a hashed parameter for the object, wherein the hashed parameter has a binary representation;

identifying a register from among a set of registers based on a first portion of the binary representation of the hashed parameter, wherein each register in the set of registers comprises a data structure that stores data about objects in the dataset, wherein the data structure for each register in the set of registers has a first field, a second field, and a third field, and wherein the third field stores an aggregation amount representing a number of occurrences of a corresponding object in the dataset;

determining, based on a comparison of a second portion of the binary representation of the hashed parameter with data in the first field and the second field of the data structure of the register, that the hashed parameter for the object contributes to the aggregation amount; and in response to determining that the hashed parameter for the object contributes to the aggregation amount, updating the aggregation amount stored in the third field of the register; and generating, based on aggregate amounts stored in the set of registers, a reporting output that indicates a set of data items, wherein each data item identifies an estimated number of objects in the dataset that performed activities in the digital environment at a particular aggregation amount.

16. The non-transitory computer readable medium of claim 15, wherein
each object represents a user; and
an aggregation amount represents a frequency value.

17. The non-transitory computer readable medium of claim 15, wherein the data structure includes:
the first field for storing data specifying a number of leading zeroes in the second portion of the received hashed parameter;
the second field for storing data specifying trailing bits in the second portion of the received hashed parameter; and
the third field for storing data specifying the aggregation amount.

18. The non-transitory computer readable medium of claim 17, wherein determining, based on the binary representation of the hashed parameter, that the hashed parameter for the object contributes to an aggregation amount, comprises:
determining a number of leading zeros from the second portion of the binary representation of the hashed parameter;
determining trailing bits from the second portion of the binary representation of the hashed parameter; and
determining, based on the number of leading zeros and the trailing bits, that the hashed parameter impacts an existing data value stored in the third field of the data structure of the register.

19. The non-transitory computer readable medium of claim 18, wherein determining, based on the number of leading zeros and the maximum number of trailing bits, that the hashed parameter impacts an existing data value stored in the third field of the data structure of the register, comprises:
determining that the existing data value stored in the first field of the data structure of the register is the same as the number of leading zeros; and
determining that the existing data value stored in the second field of the data structure of the register is the same as the maximum number of trailing bits.

20. The non-transitory computer readable medium of claim 18, wherein updating the aggregation amount stored in the register, comprises incrementing the existing data value stored in the third field of the data structure of the register.

21. The non-transitory computer readable medium of claim 17, wherein generating, based on aggregate amounts stored in the set of registers, a reporting output that indicates a set of data items, wherein each data item identifies an estimated number of objects in the dataset that performed activities in the digital environment at a particular aggregation amount, comprises:
identifying a set of unique aggregate amounts based on aggregation amounts stored in the set of registers;
for each particular aggregation amount in the set of aggregation amounts, determining an estimated number of objects of the dataset that performed activities at the particular aggregation amount, the determining includes:
determining a number of registers storing an aggregation amount that matches the particular aggregation amount;
adjusting the number of registers storing the aggregation amount that matches the particular aggregation amount based on a hash collision correction factor;
determining an average number of object stored in each register of the set of registers; and
scaling the adjusted number of registers by the average number of objects.

\* \* \* \* \*